US008959612B2

(12) United States Patent
DeBaille et al.

(10) Patent No.: US 8,959,612 B2
(45) Date of Patent: Feb. 17, 2015

(54) SECURE SYSTEM FOR INTERCONNECTION BETWEEN TWO PUBLIC NETWORKS

(75) Inventors: Suzanne DeBaille, Paris (FR); Stéphane Touyet, Gennevilliers Cedex (FR)

(73) Assignee: Thales, Neuilly-sur-Seine (FR)

( * ) Notice: Subject to any disclaimer, the term of this patent is extended or adjusted under 35 U.S.C. 154(b) by 127 days.

(21) Appl. No.: 13/699,591

(22) PCT Filed: May 20, 2011

(86) PCT No.: PCT/EP2011/058258
§ 371 (c)(1),
(2), (4) Date: Jan. 24, 2013

(87) PCT Pub. No.: WO2011/144737
PCT Pub. Date: Nov. 24, 2011

(65) Prior Publication Data
US 2013/0205384 A1    Aug. 8, 2013

(30) Foreign Application Priority Data

May 21, 2010   (FR) ...................................... 10 02154

(51) Int. Cl.
| H04L 29/06 | (2006.01) |
| H04B 7/185 | (2006.01) |
| H04L 12/46 | (2006.01) |
| H04L 12/24 | (2006.01) |

(52) U.S. Cl.
CPC ........ *H04L 63/0227* (2013.01); *H04B 7/18508* (2013.01); *H04L 12/4641* (2013.01); *H04L 41/0663* (2013.01); *H04L 63/18* (2013.01)

USPC .................. 726/13; 726/11; 726/12; 726/14; 709/217; 709/218; 709/219; 709/224; 709/225; 709/230; 709/231; 709/232

(58) Field of Classification Search
USPC ................................ 726/11–14; 709/217–237
See application file for complete search history.

(56) References Cited

U.S. PATENT DOCUMENTS

| 7,007,299 | B2 * | 2/2006 | Ioele et al. ....................... 726/14 |
| 7,260,840 | B2 * | 8/2007 | Swander et al. ................. 726/13 |
| 7,451,483 | B2 * | 11/2008 | Chang et al. ..................... 726/15 |
| 2007/0127460 | A1 | 6/2007 | Wilber | |

(Continued)

OTHER PUBLICATIONS

Aviation Data Networks: Security Issues and Network Architecture by Thanthry et al; Publisher: IEEE; Year: 2005.*

(Continued)

*Primary Examiner* — Madhuri Herzog
(74) *Attorney, Agent, or Firm* — Baker & Hostetler LLP

(57) ABSTRACT

A secure interconnection system between two public networks comprises at least one first router, a first firewall, a second router, a second firewall and a blade server, and a first virtual local area network containing the data streams exchanged between a first communications facility and a second communications facility, a second virtual local area network containing the management and maintenance streams of said system which are exchanged between a supervision center and the blade server and a third virtual local area network containing the authentication streams for said first communications facility which are exchanged between the said second firewall and said blade server, said virtual local area networks being designed so as to exhibit an empty intersection.

8 Claims, 5 Drawing Sheets

(56) References Cited

U.S. PATENT DOCUMENTS

2007/0214360 A1 9/2007 Royalty
2009/0082013 A1* 3/2009 Eckert et al. .................. 455/431

OTHER PUBLICATIONS

A Policy-aware Switching Layer for Data Centers by Joseph et al; Publisher: ACM; Date: Aug. 2008.*

Jodar, J. C. et al., "Wi-Fi Gatelink Trial Frankfurt and Munich, Germany White Paper," ARINC, Aug. 9, 2006, pp. 1-18, XP002612648, Retrieved from the Internet: URL:http://www.arinc.com/downloads/gatelink_trial_white_paper.pdf on Dec. 8, 2010.

Ali, M. S. et al., "Airplane Data Networks and Security Issues," Digital Avionics Systems Conference, 2004. DASC 04., The 23rd, Oct. 24, 2004, pp. 8.E.1-1-8.E.1-12, XP010764912, Salt Lake City, UT, USA ISBN: 978-0-7803-8539-9.

Anonymous, "A Technical Overview of Sun's AdvancedTCA White Paper," Sun Microsystems, 2006, pp. 1-39, XP002612649, Retrieved from the Internet: URL:http://www.filibeto.org/sun/lib/hardware/atca/ATCAArchitecture_White_Paper.pdf on Dec. 8, 2010.

Rekhter, Y. et al., "Address Allocation for Private Internets," Network Working Group Request for Comments, vol. 1918, Feb. 1, 1996, pp. 1-7, XP003017792.

* cited by examiner

SECURE SYSTEM FOR INTERCONNECTION BETWEEN TWO PUBLIC NETWORKS

CROSS-REFERENCE TO RELATED APPLICATIONS

This application is a National Stage of International patent application PCT/EP2011/058258, filed on May 20, 2011, which claims priority to foreign French patent application No. FR 1002154, filed on May 21, 2010, the disclosures of which are incorporated by reference in their entirety.

FIELD OF THE INVENTION

The present patent application relates to a secure interconnection system between two public telecommunications networks. One of the objectives of the invention consists in end-to-end management of private communications between a mobile terminal connected to the first public network and private or public users having access to the second public network. Preferably, one of the two networks is an L-band satellite civilian network and the other is a terrestrial public network adhering to the MPLS ("Multiprotocol Label Switching") IP protocol. The invention is notably applied to systems for communications between an aircraft and a communication infrastructure situated on the ground and in particular to services of "cabin" type intended for the passengers of an aircraft, for example voice, data or image services intended for passengers whose confidentiality and data protection requirements are high.

BACKGROUND

The everyday prevalence of telecommunications services, notably mobile services, has led civilian satellite operators to develop, on the basis of technologies that are compatible with the IP Internet protocol, such as GPRS technology or UMTS technology, new communications solutions for users situated aboard an aircraft. The communications transported over satellite networks are relayed on the ground to fixed and mobile public networks by way of terrestrial interconnection architectures intended for these uses. Civilian satellites are called on to play a significant role in aeronautics, as a supplement to terrestrial systems not only for maintenance and air traffic control services, so-called "cockpit" services intended for aircraft pilots, but also for the everyday services, so-called "cabin" services, intended for passengers.

To benefit from increased overall bandwidth and international coverage, the use of civilian satellite networks is envisaged to provide for communication services aboard aircraft.

One of the problems to be solved in this context relates to the secure interconnection between the satellite network and the terrestrial network. Indeed, within the framework of applications which require security of contents, it is necessary to authenticate the streams originating from or destined for the aircraft, to partition the data streams transmitted between the two networks, to protect them against intrusion or denial of services by ill-intentioned third parties and to ensure maximum availability of the transport solution for the streams.

Another problem resides in the monitoring of the overall operation of the end-to-end services in real time from a remote ground management centre in an effective and secure manner while circumventing systematic interrogation of the aircraft's facilities.

The existing offerings of services making it possible to send and to receive data or calls from or to an aircraft via a satellite linkup are implemented by so-called APN ("Access Point Name") interconnection systems hooked up to the public data networks, in particular the Internet. These systems are shared between civilian users and users requiring a high degree of confidentiality. Interfaced with the public networks, they are accessible from the outside and are not protected against intrusion. The users' data streams are mixed with the service streams (management, signalling). They are not separated as a function of their sensitivity level nor of the degree of protection that they require. Thus a third party can, from a connection to the terrestrial network through the Internet or a switched telephone network, recover the data sent/received from the aircraft by accessing a management port for one of the facilities of the interconnection system or by encroaching into the network by usurping the identification of a satellite subscriber.

Thus the solutions of the prior art do not make it possible to provide the user and the operator with protection against intrusions, viruses or any form of outside attack nor to provide a guarantee of high service availability.

Moreover, no mechanism for real-time control of the satellite resources is implemented from the ground in the known solutions. The management of the resources is carried out in non-real time on the basis of the billing information provided a posteriori by the satellite operator.

The monitoring of end-to-end communications between the ground and the aircraft therefore requires the development on a case by case basis, directly on the means of satellite communication of aircraft, of dedicated applications which are periodically interrogated from the ground and during flights. This scheme comprises high risks of intrusion and of attack on aircraft and exhibits bandwidth constraints that are inherent when introducing management streams on the same satellite linkup as the data streams.

SUMMARY OF THE INVENTION

The present invention makes it possible to resolve the aforementioned limitations by the implementation of an interconnection system which makes it possible to afford a high level of data security while using public terrestrial and satellite networks. Moreover it makes it possible to supervise the connections originating from the aircraft while guaranteeing the confidentiality of the streams, without having to directly access the communication means aboard the aircraft and without introducing any additional signalling streams on the satellite link.

For this purpose the subject of the invention is a secure interconnection system between a first public communications network and a second public communications network, a first communications facility linked directly to the said first public network communicating with a second communications facility linked directly to the said second public network, the said system being characterized in that it comprises at least:

a first router receiving at least one communication stream arising from the said first public network, to which it is connected, and destined for the said second public network, a first firewall linked directly to the said first router suitable for separating, within the said communication streams, the data streams and the signalling streams, a second router which receives the data streams of the said first firewall and transmits them to the said second public network to which it is connected, a second firewall which receives the signalling streams of the said first firewall to which it is directly connected, a blade server which receives the signalling streams of the said second firewall to which it is directly connected, the said second firewall performing a filtering of the packets that the said signalling streams comprise as a function at least of their port number, the said second firewall being suitable for allowing secure access to the said blade server from a supervision centre or a test platform, the said interconnection system furthermore comprising a first virtual local area network containing the data streams exchanged between the said first communications facility and the said second communications facility, a second virtual local area network containing the management and maintenance streams of the said system which are exchanged between the said supervision centre and the said blade server and a third virtual local area network containing the authentication streams for the said first communications facility which are exchanged between the said second firewall and the said blade server, the said virtual local area networks being designed so as to exhibit an empty intersection.

In a variant embodiment of the invention, the said blade server comprises at least one authentication server suitable for authenticating the said first communications facility and for authorizing the opening of a connection between the said first communications facility and the said second communications facility, a capture server for the signalling streams and a supervision server which is suitable for monitoring the state of the said connections and the operation of the said system in real time.

In a variant embodiment of the invention, the said authentication server implements the RADIUS authentication protocol to centralize the authentication streams.

In a variant embodiment of the invention, the said supervision server performs an analysis of the state of the said connections on the basis of the information regarding authentication and openings of connections that the said authentication server contains.

In a variant embodiment of the invention, the said interconnection system furthermore comprises a fourth virtual local area network for the transmission, between the said supervision server and an external platform, of the streams relating to the analysis of the state of the said connections.

In a variant embodiment of the invention, the said first public network is a satellite network and the said first communications facility is situated aboard an aircraft.

In a variant embodiment of the invention, the said second public network is a terrestrial network.

In a variant embodiment of the invention, the set of the facilities that the said system comprises are duplicated to ensure redundancy in the eventuality of a fault with one of them.

BRIEF DESCRIPTION OF THE DRAWINGS

Other characteristics will become apparent on reading the detailed description given by way of nonlimiting example which follows and offered in relation to appended drawings which represent.

DETAILED DESCRIPTION

The invention is described in an embodiment which relates to a secure communication between an aircraft and a communication centre situated on the ground. Without departing from the scope of the invention, the present patent application also applies to any mobile or fixed terminal linked to the first public network by suitable communication means and situated in an aerial, naval or terrestrial means of transport.

Figure 1:
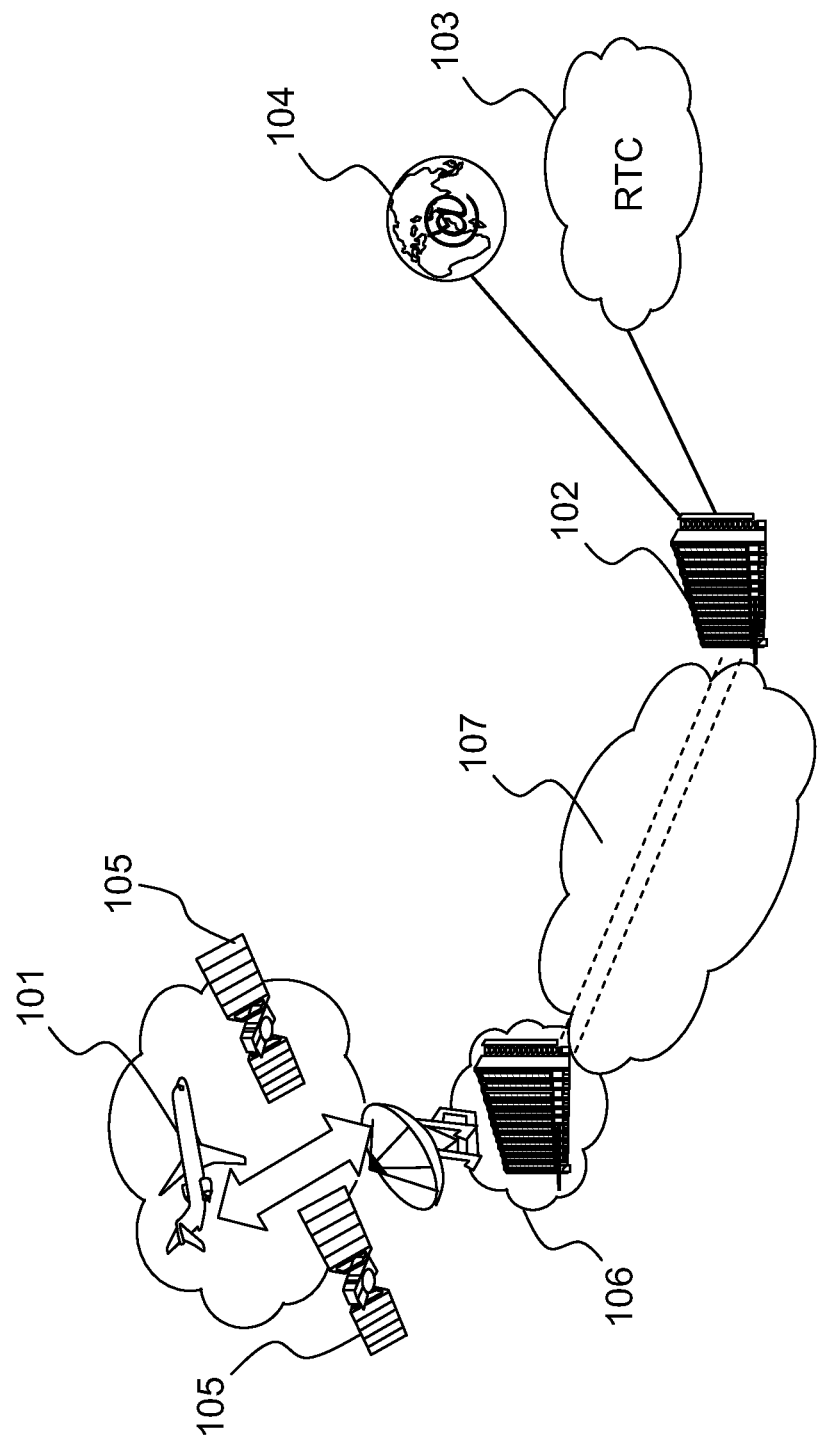
FIG. 1, a diagram representing the general interconnection architecture between an aircraft and a terrestrial network by way of a satellite network, FIG. 2, a schematic of the physical and logical architecture of the interconnection system according to the invention, FIG. 3, an exemplary establishment of connection between an aircraft and a ground facility by way of the interconnection system according to the invention, FIG. 4, an illustration of the processing of the supervision streams within the interconnection system according to the invention, FIG. 5, an illustration of the management of the quality of services by the interconnection system according to the invention.

FIG. 1 represents the general interconnection architecture between an onboard communication system aboard an aircraft 101, and a terrestrial communication centre 102 optionally linked to a switched public telephone network 103 and to an Internet network 104. The aircraft 101 communicates with the ground systems by way of a civilian satellite network 105 which broadcasts the communications to an interconnection system 106 linked to the terrestrial communication centre 102 by a dedicated data link 107 of Ethernet type, for example provided by an IP-MPLS services operator.

The aircraft 101 comprises aboard at least one modem which dynamically manages the data streams between the local area network of the aircraft 101 and the satellite system 105.

The role of the interconnection system 106 according to the invention is the authentication of the modems aboard the aircraft 101, the management of the requests and streams originating from or heading for the satellite, and the secure transmission of the data streams between the terrestrial communication centre 102 and the aircraft 101. For this purpose, it does not comprise any non-secure communication linkup to public networks or Internet networks. The terrestrial communication centre 102 is linked to public networks 103, 104. It carries out the steering of the communications towards the users internal to the system and the public users. The satellite system 105 also constitutes a public network. The communication streams between the aircraft 101 and the terrestrial centre 102 are private communications, the problem dealt with by the present invention then consists in securing in an effective manner the data streams between these two entities despite the fact that all the networks used are public and accessible to third parties. This problem is solved by the interconnection system 106 according to the invention which implements a set of mechanisms for securing the data exchanged between the aircraft and the ground.

Figure 2:
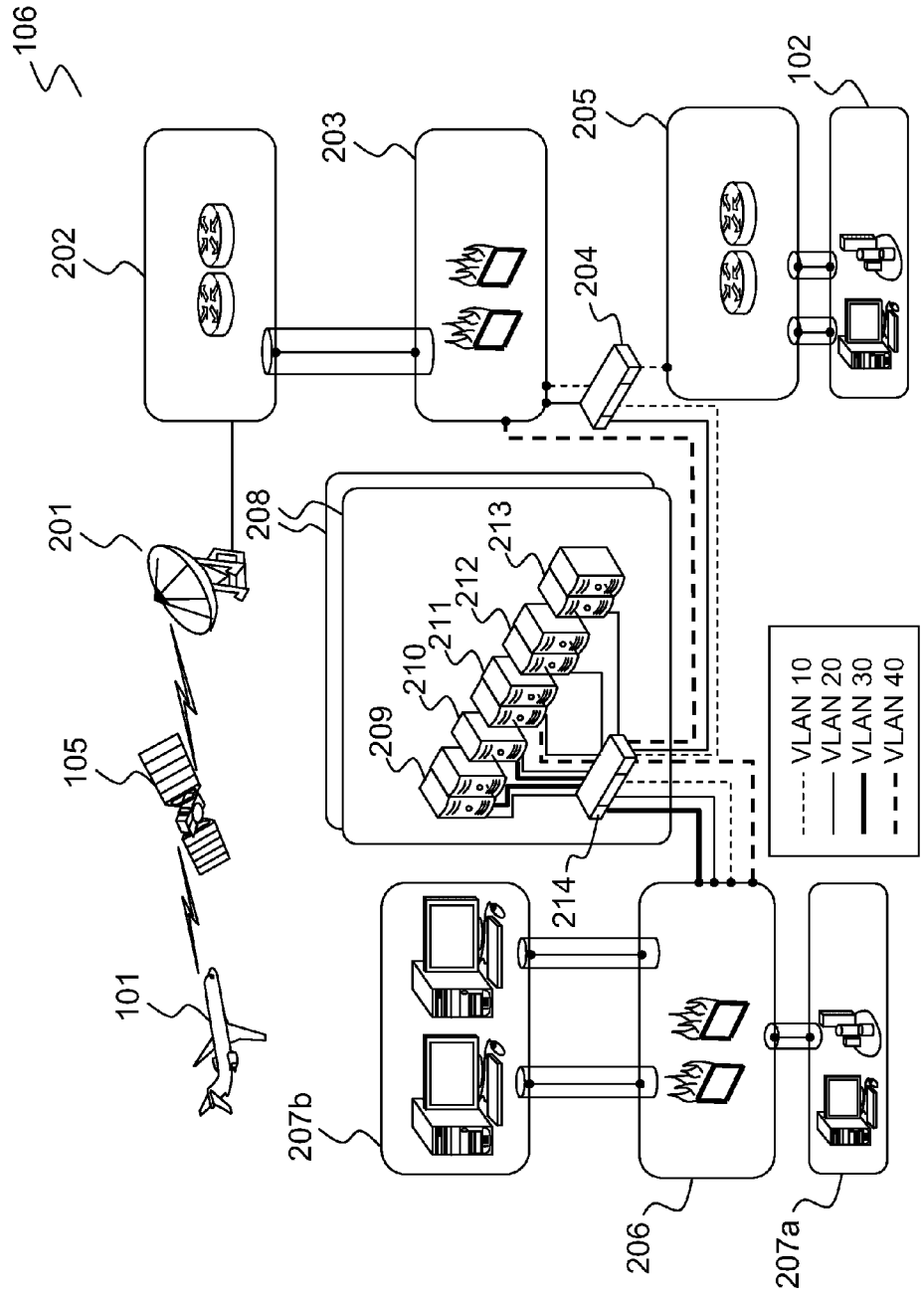

FIG. 2 illustrates the physical and logical architecture of the interconnection system 106 according to the invention. It comprises a set of facilities which are all duplicated and operate in main/backup mode without any interruption of traffic in the eventuality of toggling so as to ensure overall redundancy. For each pair of facilities, one of the two entities operates in nominal mode and the other intervenes as backup facility in the eventuality that a malfunction might impact the first facility. All the databases of the system are replicated in real time without loss of context information and without any session interruption in the eventuality of toggling.

For the sake of clarity, only the nominal facilities will be described subsequently, knowing that, as is illustrated in FIG. 2, they can all be duplicated.

The interconnection system 106 according to the invention comprises a first router 202 which plays the role of interconnection gateway in relation to the satellite system 105 and which is linked directly to a satellite terrestrial station 201 which receives the satellite data streams, in particular those originating from the aircraft 101. The router 202 possesses a public IP address. It is linked directly by way of an encrypted tunnel to a firewall 203 which exhibits a private IP address and the function of which is to steer the data streams originating from the aircraft 101 and destined for the terrestrial centre 102. A second router 205 is charged with conveying the said data streams filtered by the firewall 203 towards the terrestrial centre 102 through an encrypted tunnel, it plays the role of point of access to the terrestrial transport network and possesses a private IP address that is non-routable on the Internet. The signalling streams serving for the authentication of the satellite subscribers and for the establishment of session requests originating from the satellite network are also filtered by the firewall 203. They are moreover steered, via a network switch 204 towards a second firewall 206, the function of which is the filtering of the signalling requests to the authentication server 209 and the control of access to the supervision server 211 of the system for authorized administrators. The firewall 206 exhibits a public IP address. It makes it possible to manage access for authorized administrators to the supervision server 211 of the system from a remote supervision centre 207b, and allows the transfer from the databases 213 to the test platform 207a in non-real time and on demand for authorized administrators.

Finally, the interconnection system 106 comprises a blade server 208. A blade server is a server designed for very small proportions. The blade server 208 comprises two authentication servers 209 for the processing of the requests and signalling originating from the satellite network, a capture server 210 for signalling, monitoring and management frames, two supervision servers 211 for the real-time monitoring of the facilities of the system, two application servers 212 and two databases 213 used for the management of the notifications and information regarding alarms and the storage of the management information. All the servers internal to the blade server 208 possess private IP addresses except the authentication server 209 which possesses a public IP address. Advantageously, the authentication server 209 implements the RADIUS ("Remote Authentication Dial-In User Service") authentication protocol making it possible to centralize the authentication data. This protocol is standardized by the IETF group under the references RFC 2865 and RFC 2866. The blade server 208 is connected to the other facilities by way of a network switch 214.

The interconnection system 106 also comprises a logical and physical architecture composed of several virtual local area networks or VLANs, the objective of which is to effect a physical and logical separation of the various types of streams which pass through the said system 106 with the aim of ensuring the partitioning of the data and their protection against intrusion. A first virtual local area network 10 is associated with the data streams transmitted between the ground and the aircraft 101 or vice versa. The traffic on this first virtual local area network 10 is not accessible from an outside public network other than the satellite network 105 and the terrestrial transport network 102.

A second virtual local area network 20 allows the remote monitoring and management of the facilities of the interconnection system 106 from the supervision system 207b. On the one hand it makes it possible to restrict remote access solely to persons authorized to manage the configuration, the operation and the administration of the said system 106. On the other hand, it also allows all the notifications and alarms emanating from the supervision server 211 to be transported to the remote supervision centre 207b. The management streams are conveyed on a secure and encrypted connection, for example a connection using the IP-sec protocol. Thanks to this second virtual local area network 20, it is not possible to access the configurations of the said system 106 nor the monitoring information from the Internet network or even from the satellite 105 and terrestrial 102 public networks.

A third virtual local area network 30 is dedicated to access and authentication requests originating from the satellite network 205 to the interconnection system 106. It is used upon each request for registration, opening or closing of satellite channels.

A fourth virtual local area network 40 allows the recovery, in non-real time, of statistical information from the supervision server 211 so as to carry out analyses of service quality. This network 40 also makes it possible to perform tests of the system via streams of tests transmitted from the aircraft to the test platform 207a.

The four virtual local area networks 10, 20, 30, 40 are identified in FIG. 2 by the data paths covered for each of the said networks. They are designed so as to exhibit an empty intersection, that is to say no communication stream belonging to one of these virtual local area networks travels over one of the other virtual local area networks.

Figure 3:
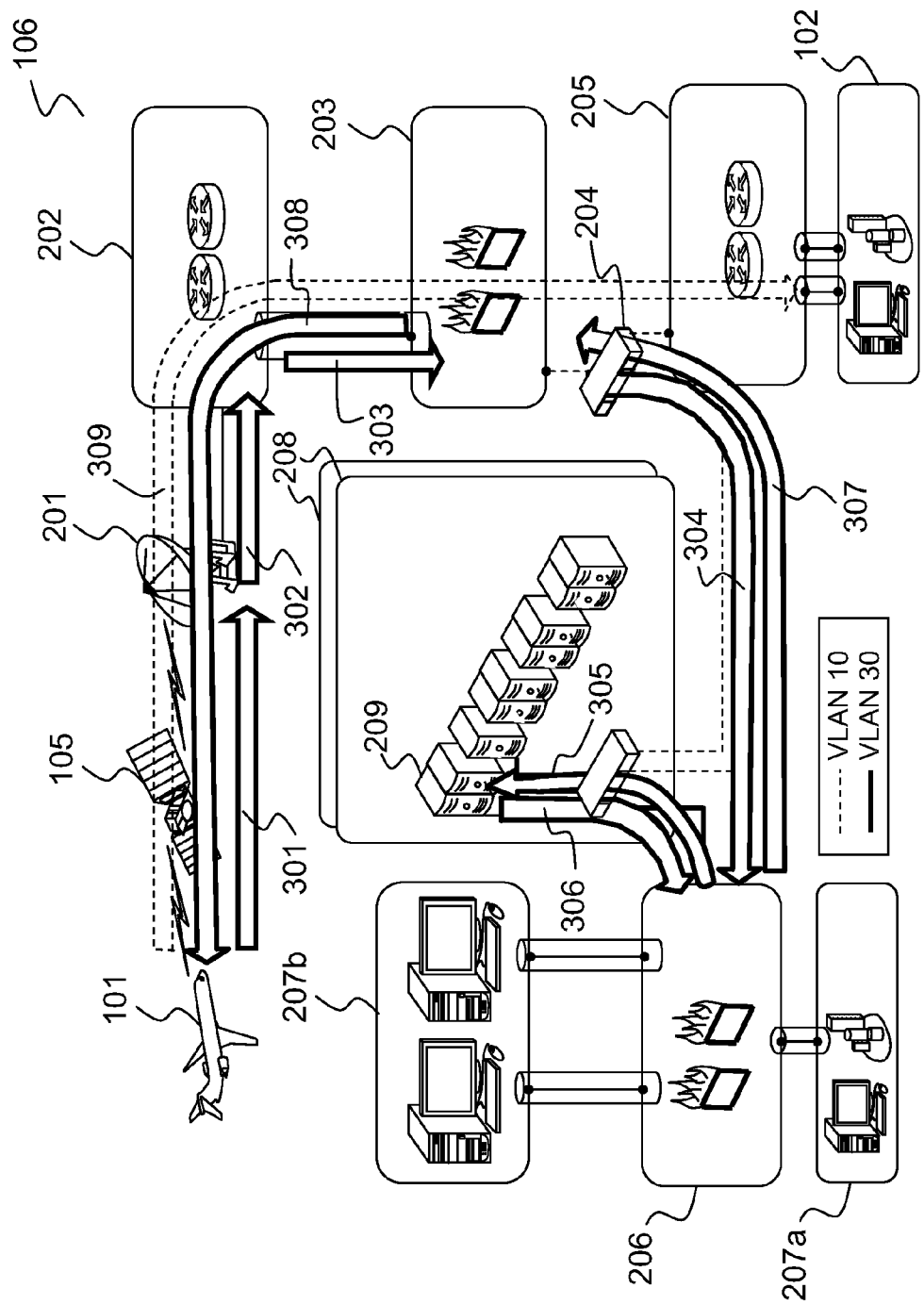

Management of the Streams Travelling Through the Interconnection System According to the Invention FIG. 3 illustrates an exemplary establishment of connection between an aircraft and a ground facility by way of the interconnection system 106 according to the invention.

In a first step 301, the satellite modem that the aircraft 101 comprises registers on the satellite network 105, by way of a registration request. A first authentication of the modem of the aircraft is carried out by the authentication system specific to the satellite network. To activate a transport service, the modem of the aircraft sends an IP address request to the interconnection system 106 by using the domain name reserved for the said system 106. This request also contains information about the desired bandwidth for the establishment of the connection.

In a second step 302, the authentication request is reformatted by the satellite network which transmits it to the first router 202.

The request is thereafter presented 303 to one of the two firewalls 203 on a private address. The firewall redirects it 304 through the virtual local area network VLAN 10 to one of the two second firewalls 206 so that the latter performs a verification of the filtering rules towards the authentication server 209.

On the second firewalls 206, the lists of permissions are configured so as to authorize only the packets comprising a given port number via which the request traffic is transmitted to the virtual local area network VLAN 30. Thus only the authentication messages destined for or originating from the server 209 and the connection messages can enter the virtual local area network VLAN 30.

The authentication server 209 carries out an authentication 305 performed at least on the basis of one of the following parameters: a number identifying the modem of the aircraft 101, for example an IMSI ("International Mobile Subscriber Identity") number and a user name and the password associated therewith. The server 209 thereafter allocates a specific IP address as a function of the type of service requested or of a given service quality level.

The IP address allocated by the server 209 is thereafter returned 306, 307, 308 to the authenticated modem of the aircraft 101. This information stream is viewed as an operation at the supervision level and is conveyed to the satellite network 105 on the virtual local area network VLAN 30 and then the virtual local area network VLAN 10 by passing successively through the two firewalls 206, 203 and the router 202. Once authenticated, the satellite modem of the aircraft 101 has its IP address and can communicate 309 with the terrestrial network 102.

The communication traffic transmitted by the modem of the aircraft 101 arrives at the firewall 203 which establishes a private linkup to the terrestrial network on the private virtual network VLAN 10 and redirects the traffic directly to the terrestrial network 102 through the router 205. This data traffic is not accessible from the other private virtual networks. The interconnection system 106 according to the invention carries out for this purpose a partitioning of the data so as to completely secure access to the communications aboard the aircraft 101. The fact that the authentication requests travel on a private virtual network VLAN 30 which is distinct from that on which the data travel makes it possible to avoid unauthorized access to the communication system aboard the aircraft 101 which would be possible if all the streams, data and signalling, travelled through the same logical channel between the aircraft 101, the satellite network 105 and the terrestrial network 102. The four virtual private networks 10, 20, 30, 40 according to the invention allow separation between the data stream, authentication stream or else the monitoring and management stream. In particular the invention makes it possible to separate the streams associated with the maintenance of the facilities from those which relate to the data traffic. A user who has authorization to access the virtual private network 20 for maintenance of the blade server 208 does not have any access to the virtual private network 10 which contains the data exchanged between the aircraft 101 and the terrestrial network 102. Thus, the intrusion into the system by an unauthorized third party is avoided.

Figure 4:
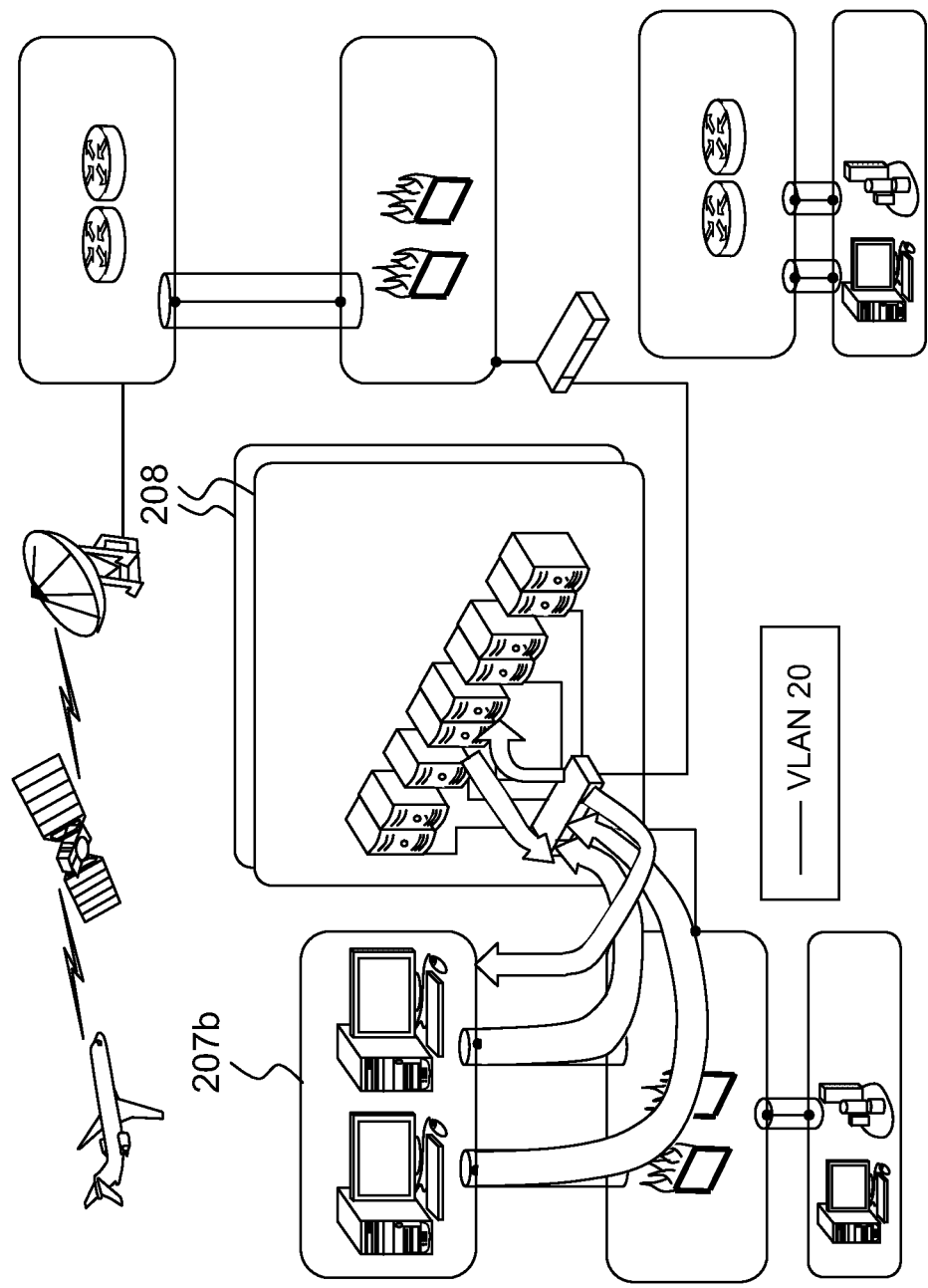

This principle is illustrated in FIG. 4. The remote management of the blade server 208 is performed on the basis of the supervision system 207b situated remotely. The management streams travel via the private virtual network VLAN 20.

Management of the Service Quality and of the Authentication Requests

The satellite network 105 makes it possible to differentiate several types of services. A first service can provide a peak high throughput but with no guarantee of this throughput being sustained throughout the connection. One speaks of "best effort" service. Another service can allocate lower throughputs which are, however, guaranteed throughout the connection, one then speaks of services with guaranteed throughput. In general, the data broadcast as plaintext and access to the Internet network pass through the channel associated with the "best effort" service whereas the secure communications use channels with guaranteed throughput. These various services are activated by requests to open channels associated with the said service.

In aeronautical communications, the communication channels may be degraded on account of the poor propagation conditions. They are thus subject to phenomena of instantaneous loss of the signal, which are related notably to the inclinations of the antennas of the aircraft and to its motion.

These signal losses give rise to untimely disconnections of the modem and render the link with the satellite network unstable. These events are one of the causes of malfunction of the services.

To stabilize the operation of the service and avoid an avalanche of reconnection requests, the known satellite systems set timeouts of possibly up to 30 minutes to maintain the connection in the eventuality of modem signal loss. These events are not managed under supervision. Therefore the known solutions consist in interrogating at a given frequency, for example every minute, the modem of the aircraft during the flight so as to verify the service quality provided aboard. Now, the systematic interrogation from the ground of the satellite modem of the aircraft during the flight phases presents a significant safety risk. For safety reasons, it is not desirable to transmit interrogation requests from the ground to the aircraft during the flight phases.

Figure 5:
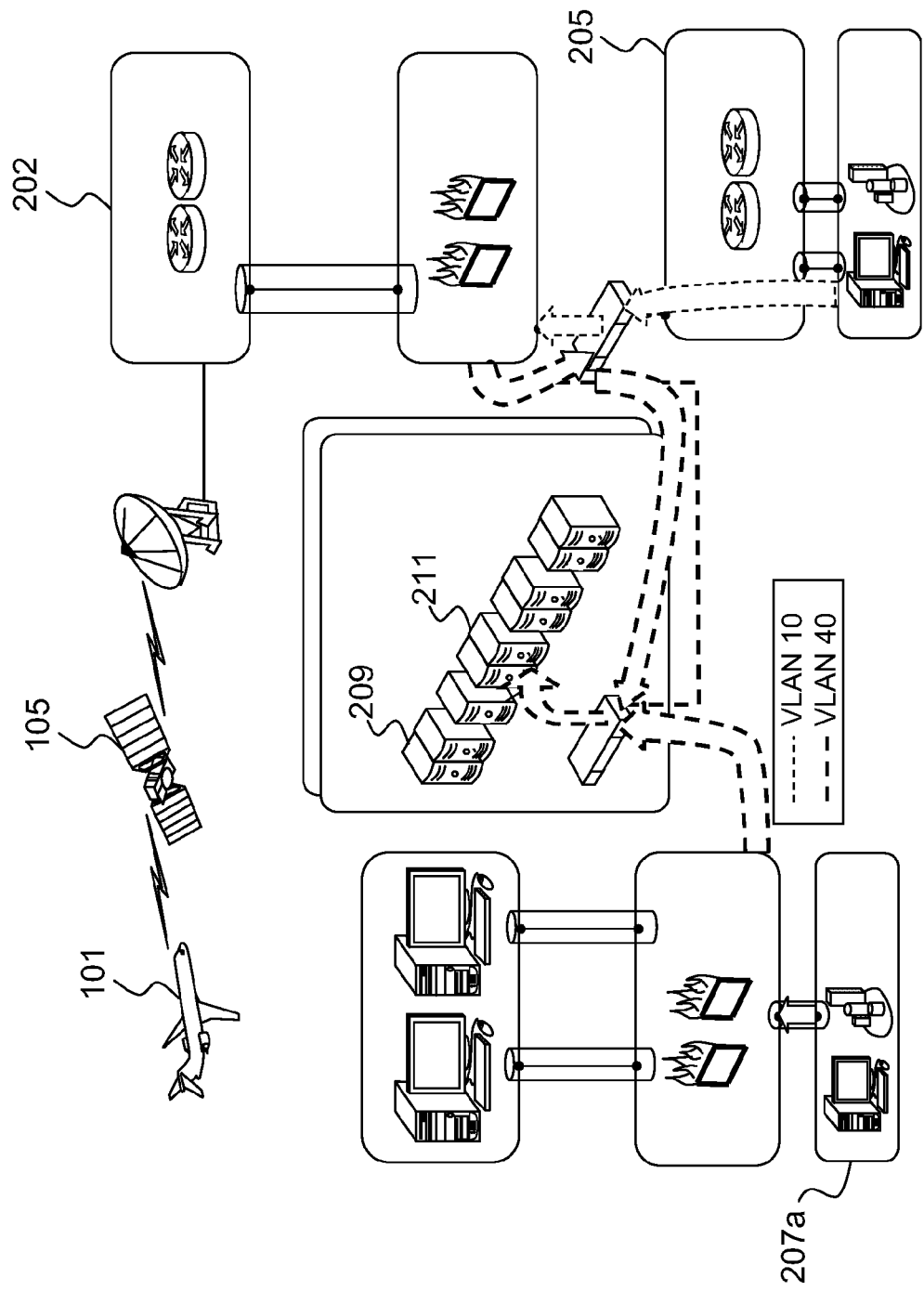

To alleviate this problem, the interconnection system according to the invention allows localized quality of services management at the said system without interrogation of the communication means aboard the aircraft. For this purpose, it carries out an analysis of the authentication requests stored in the authentication server 209 and of the number of channels activated in parallel by the said system such as illustrated in FIG. 5.

This analysis of the types of open channels and of their throughputs allows a supervisor to obtain an indication on the activity of the applications between the ground and the aircraft. A significant advantage of this solution resides in the fact of not using the satellite bandwidth to transmit service information and of avoiding interrogation of the modem aboard the aircraft during its flight. The analysis performed makes it possible to deliver indicators in real time during the flight phases and to establish activity logs and reports at the end of each flight. The information regarding authentication request and open channels is stored in the supervision server 211 and is transmitted to the platform 207a on request of the latter performed by way of the virtual local area network VLAN 40 and to the client supervisor 102 on request by way of the virtual local area networks VLAN 10 and VLAN 40.

The method implemented is as follows.

Periodically, an application executed on the supervision server 211 measures the number of activated channels, the session start and end date, the duration of the transmission and the associated throughput. This measurement makes it possible to determine the number of simultaneously open channels and therefore the number of active communications. The application dedicated to this measurement interrogates the authentication server 209 which has undertaken the opening of the various channels. In parallel, the number of linkups for traffic travelling through the routers 202 and 205 is measured as well as the throughputs of the input/output streams on these routers.

If the number of linkups passing through the said routers is different from the number of open channels or if the traffic measured on the various elements is inconsistent an incident ticket is generated by the application and transmitted to the platform 207a. The function of this incident ticket is to forewarn of a degradation of the service provided aboard the aircraft.

Moreover, the application executed on the supervision server 211 also makes it possible to analyse the throughputs actually allocated by the satellite network on the various channels and to compare them with the throughputs demanded. This analysis is, for example, performed during the disconnection of a channel and at a given frequency, for example every 30 minutes. The information regarding allocated throughputs makes it possible to determine the bandwidth actually available on the satellite network and to identify the service degradations in terms of bandwidth.

At the end of each flight, statistics may be generated on the allocated throughputs, the number of open channels and the number of incidents detected. These statistics are created by the supervision server 211 and then forwarded to the platform 207a and to the terrestrial communication centre 102.

The advantage of the present invention is to allow a high level of data security while using public networks. Moreover it allows supervision from the ground of the connections originating from the satellite network while guaranteeing the confidentiality of the streams and circumventing interrogation of the facilities aboard the aircraft. The interconnection infrastructure according to the invention may be used to interconnect any type of terrestrial public network with satellite networks for aeronautical, terrestrial or maritime applications. In particular the invention also applies to the secure communication between a ship and a terrestrial centre by way of a satellite network.

The invention claimed is:

1. A secure interconnection system between a first public communications network and a second public communications network, where a first communications facility is linked directly to the first public network communicating and a second communications facility is linked directly to the second public network, the system comprising:
    a first router configured to receive at least one communication stream from the first public communications network, to which the first router is connected, the at least one communication stream destined for the second public communications network, and the at least one communication stream comprising a data stream and a signaling stream,
    a first firewall directly connected to the first router and configured to separate, within the at least one communication stream, the data stream and the signaling stream,
    a second router configured to receive only the data stream from the first firewall and to transmit the data stream to the second public communications network to which the second router is connected,
    a second firewall configured to receive only the signaling stream from the first firewall to which the second firewall is directly connected,
    a blade server configured to receive only the signaling stream from the second firewall to which the blade server is directly connected,
    a first virtual local area network comprising the data stream exchanged between the first communications facility and the second communications facility,
    a second virtual local area network comprising management and maintenance streams of said secure interconnection system which are exchanged between a supervision center and the blade server, and
    a third virtual local area network comprising authentication streams for the first communications facility which are exchanged between the second firewall and the blade server,
    wherein the first virtual local area network, the second virtual local area network, and the third virtual local area network exhibit an empty intersection,
    wherein the second firewall is further configured to filter packets within the signaling stream as a function at least of a port number of the packets, and
    wherein the second firewall is further configured to allow secure access to the blade server from the supervision center or a test platform.

2. The secure interconnection system according to claim 1, wherein:
    the blade server further comprises at least one authentication server configured to authenticate the first communications facility and to authorize opening of a connection between the first communications facility and the second communications facility, and
    the secure interconnection system further comprises:
        a capture server configured to capture the signaling stream, and
        a supervision server configured to monitor a state of connections and operation of the secure interconnection system in real time.

3. The secure interconnection system according to claim 2, wherein the at least one authentication server is configured to implement a RADIUS authentication protocol to centralize the authentication streams.

4. The secure interconnection system according to claim 3, wherein the supervision server is configured to analyze the state of the connections based on information regarding the authentication and openings of connections within the authentication server.

5. The secure interconnection system according to claim 4, further comprising a fourth virtual local area network configured to transmit, between the supervision server and an external platform, streams relating to the analysis of the state of the connections.

6. The secure interconnection system according to claim 1, wherein the first public communications network is a satellite network and the first communications facility is situated aboard an aircraft.

7. The secure interconnection system according to claim 1, wherein the second public network is a terrestrial network.

8. The secure interconnection system according to claim 1, wherein the first communications facility and the second communications facility are duplicated for redundancy.

* * * * *